United States Patent
Bunsmann

(10) Patent No.: US 7,722,106 B2
(45) Date of Patent: May 25, 2010

(54) TAILGATE FOR A MOTOR VEHICLE AND A MOTOR VEHICLE HAVING SUCH A TAILGATE

(75) Inventor: Winfried Bunsmann, Bissendorf (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 309 days.

(21) Appl. No.: 11/667,002

(22) PCT Filed: Nov. 1, 2005

(86) PCT No.: PCT/DE2005/001949

§ 371 (c)(1),
(2), (4) Date: Nov. 5, 2007

(87) PCT Pub. No.: WO2006/047995

PCT Pub. Date: May 11, 2006

(65) Prior Publication Data

US 2008/0174137 A1    Jul. 24, 2008

(30) Foreign Application Priority Data

Nov. 3, 2004    (DE) ........................ 10 2004 052 891

(51) Int. Cl.
*B60P 1/267* (2006.01)
(52) U.S. Cl. ...................................... 296/50
(58) Field of Classification Search .............. 296/50, 296/106, 146.1, 146.2, 146.8, 51, 56, 57.1
See application file for complete search history.

(56) References Cited

U.S. PATENT DOCUMENTS

| | | | |
|---|---|---|---|
| 3,645,043 A * | 2/1972 | Velavicius et al. ............ 296/50 |
| 4,353,111 A | 10/1982 | Gallitzendörfer et al. |
| 4,631,516 A * | 12/1986 | Clinker ....................... 340/464 |
| 4,703,398 A | 10/1987 | Huth et al. |
| 4,768,027 A * | 8/1988 | Benjamin et al. ...... 340/426.23 |
| 4,954,808 A * | 9/1990 | Duerkob ...................... 362/541 |
| 5,211,466 A | 5/1993 | Jarocki |
| 5,241,457 A | 8/1993 | Sasajima et al. |
| 5,408,216 A | 4/1995 | Klaiber et al. |
| 5,652,565 A * | 7/1997 | Salcedas et al. ............. 340/479 |
| 5,905,434 A * | 5/1999 | Steffan et al. ............... 340/464 |
| 5,947,536 A * | 9/1999 | Mizuki et al. ............... 292/201 |
| 6,030,105 A * | 2/2000 | Thau et al. ................... 362/488 |
| 6,177,866 B1 * | 1/2001 | O'Connell ................... 340/466 |
| 6,268,793 B1 * | 7/2001 | Rossi ........................... 340/471 |
| 7,020,992 B1 * | 4/2006 | Christie ....................... 40/593 |
| 7,378,948 B2 * | 5/2008 | Somuah ....................... 340/436 |

(Continued)

FOREIGN PATENT DOCUMENTS

DE    80 34 379 U1    5/1982

(Continued)

*Primary Examiner*—Kiran B. Patel
(74) *Attorney, Agent, or Firm*—J-Tek Law PLLC; Jeffrey D. Tekanic

(57) ABSTRACT

In a tailgate for a motor vehicle, which comprises a lower tailgate body (18), on which a rear window (22) is mounted, on whose upper area a supplemental brake light (24) is provided, the rear window (22) is lowerable into the tailgate body (18), wherein the rear window, at least when the vehicle is driven, is lowerable only so far that its upper area provided with the supplemental brake light (24) upwardly projects from the tailgate body.

8 Claims, 1 Drawing Sheet

U.S. PATENT DOCUMENTS

| | | | |
|---|---|---|---|
| 2001/0055212 A1* | 12/2001 | Phillips | 362/487 |
| 2003/0085594 A1 | 5/2003 | Engelgau | |
| 2003/0090569 A1* | 5/2003 | Poechmueller | 348/148 |
| 2007/0152467 A1* | 7/2007 | Heselhaus et al. | 296/107.01 |
| 2009/0106927 A1* | 4/2009 | Binfet et al. | 296/152 |

FOREIGN PATENT DOCUMENTS

| | | |
|---|---|---|
| DE | 42 20 654 A1 | 1/1993 |
| DE | 91 09 578.6 U1 | 1/1993 |
| DE | 195 37 594 C1 | 1/1997 |
| DE | 196 42 648 A1 | 4/1998 |
| DE | 199 13 532 A1 | 9/1999 |
| EP | 1 234 754 A1 | 8/2002 |
| EP | 1 369 274 A1 | 12/2003 |
| EP | 1 234 754 B1 | 12/2005 |
| FR | 2 738 783 A1 | 3/1997 |

* cited by examiner ent> # TAILGATE FOR A MOTOR VEHICLE AND A MOTOR VEHICLE HAVING SUCH A TAILGATE

CROSS-REFERENCE

This application is the US national stage filing of International Application No. PCT/DE2005/001949 filed Nov. 1, 2005, which claims priority to German patent application no. 10 2004 052 891.8 filed Nov. 3, 2004.

TECHNICAL FIELD

The present invention concerns a tailgate having a lowerable rear window equipped with a supplemental brake light and a motor vehicle having such a tailgate.

BACKGROUND ART

A tailgate is known from DE 195 37 594 C1, in which a circumferential frame projects upwardly from a lower tailgate body, which frame together with the upper edge of the tailgate body encompasses an opening; a rear window is disposed in the opening. The edge area of the rear window is provided with a non-transparent band that visually conceals the frame and that is shaded with rasterized dots over its entire illumination surface in the area of a supplemental brake light, which is mounted on the inside and at the upper edge of the rear window, so that the light of the supplemental brake light can pass through the window.

A supplemental brake light, which is mounted on the inside and in the upper area of a rear window is also known from DE 91 09 578.6 U, which supplemental brake light is connected via light conductors with at least one of the side brake lights.

SUMMARY OF THE INVENTION

An object of the invention is to provide a tailgate, which is usable in various ways, for a motor vehicle that facilitates design freedom for the vehicle.

This object is achieved with a tailgate according to the present invention. In one aspect of the present invention, a tailgate for a motor vehicle comprises a lower tailgate body, on which a rear window is mounted. A supplemental brake light is provided on an upper portion of the rear window and the rear window is lowerable into the tailgate body. However, the rear window is preferably lowerable, at least when the vehicle is being driven, only so far that its upper area provided with the supplemental brake light still projects above the tailgate body.

According to the inventive tailgate, the rear window provided with the supplemental brake light is lowerable into the tailgate body, wherein the lowerability, at least when the vehicle is driven, is restricted such that the upper area provided with the supplemental brake light still upwardly projects from the tailgate body. In this way, it is ensured that the legal requirements of the supplemental brake light, which is mounted higher than the side brake lights, are fulfilled at all times.

In further aspects of the present invention, the supplemental brake light may be affixed to the rear window with adhesive. In this case, flat or planar conductive paths or wires may be utilized to supply power to the brake light and the flat or planar conductive paths or wires may be attached to the edge area of the rear window. In addition or in the alternative, the edge area of the lowerable rear window may include a frame and the supplemental brake light may be integrated in the frame. In this case, power supply conductors for the supplemental brake light also may be integrated in the frame. In addition, a structural beam for mounting the tailgate on a vehicle may be formed by only the tailgate body.

A motor vehicle equipped with an inventive tailgate may include a removable structural part forming a rear part of the vehicle roof and the vehicle sides. A rearward portion of the structural part may include an opening designed to sealingly abut the edge of the closed rear window.

BRIEF DESCRIPTION OF THE DRAWING

In the following, the invention will be explained in further detail and in an exemplary manner with the assistance of a schematic drawing. The sole FIGURE illustrates a perspective view towards a rear area of a motor vehicle.

DETAILED DESCRIPTION OF THE INVENTION

Figure 1:
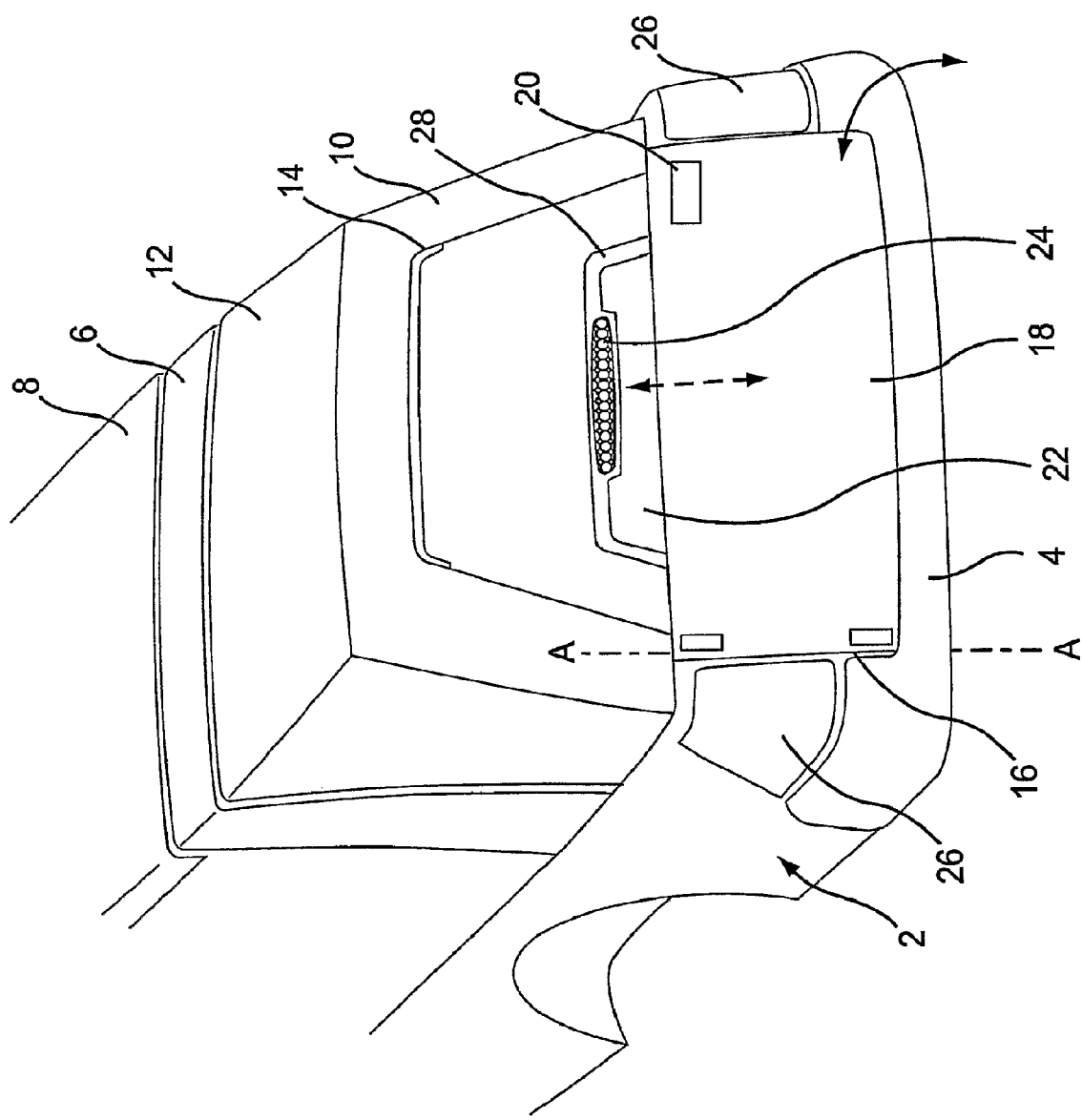

The rear area of the illustrated vehicle includes a lower car body 2 reaching approximately to the vehicle body shoulder; the lower car body 2 comprises the rear side parts having the wheel housings and the rearwardly-opening rear enclosure part that ends in the downward direction with a bumper 4. Only the outer shell parts of the car body 2 are illustrated. The car body 2 is provided with a structural bow 6 spaced from the rear end, which structural bow 6 forms a part of the outer shell of the car body; the side windows, which are not illustrated in detail, or e.g. rear side doors and the vehicle roof 8, which spans over the passenger compartment, are mounted in front of the structural bow 6. An structural part 10, which is removable in advantageous embodiments, is rearwardly attached to the structural bow; the upper side 12 of the structural part 10 forms a part of the vehicle roof and a rearward part thereof defines an opening 14.

In the illustrated example, a tailgate body 18 is mounted on the left side on the edge 16 of the rearwardly-opening car body 2; the tailgate body 18 is pivotable about a substantially vertical axis A-A. A handle for opening and closing the tailgate body 18 is denoted with 20.

A rear window 22 is accommodated in the tailgate body 18 so as to be upwardly and downwardly movable in a known manner; the rear window 22 sealing abuts on the edge of the opening 14 of the structural part 10 when the tailgate body 18 is closed and the rear window 22 is moved to its fully-raised position.

A legally-prescribed supplemental brake light 24 is provided on the upper edge portion of the rear window 22; the supplemental brake light 24 is located above the upper edge of the tailgate body 18 in the fully-closed state of the rear window 22 as well as in its opened state at least when the vehicle is driving and/or is in operation, such that it is positioned higher than lights 26, which also contain brake lights, located on each respective side of the car body 2 in a known manner.

The rear window 22 can be constructed in a wide variety of ways. For example, the supplemental brake light 24 can simply be adhered to the inner side of the rear window 22. The power supply to the supplemental brake light 24 can then take place via conductive paths that are integrated in a film or in a vapor deposition, with which the edge of the rear window 22 is darkened. In the alternative, the supplemental brake light 24 can be integrated, e.g., in a frame partially or fully enclosing the edge 28 of the rear window 22 or mounted on only one side, wherein the current supply lines are integrated into the frame.

In principle, the upward and downward movability of the rear window 22 can be restricted such that a lowering of the rear window 22 into a position, in which the supplemental brake light 24 no longer projects over the upper edge of the tailgate body 18, is not possible. In the alternative, the rear window could be fully lowerable into the tailgate body 18, e.g. when the vehicle is stationary or is not in operation (ignition off), so that, e.g., loading of the vehicle through the rear window opening is made easier. When the vehicle is started up, the rear window is then automatically moved into the illustrated position.

According to the illustrated vehicle, the fulfillment of the legal requirements with regard to brake lights is also ensured when the structural part 10 is removed, wherein the rear window can be upwardly moved as a quasi wind screen.

The inventive tailgate can be also utilized with other vehicles, e.g. station wagons, wherein relative to the design, the supplemental brake light is constructed on the lowerable rear window such that great freedom exists for the design of the upper, rear roof enclosure and this rear roof enclosure can, in particular, be designed very flat.

The tailgate body 18 can be designed without a frame and mounted on the car body 2 such that the structural stability of the tailgate body 18 is provided only by the tailgate body 18. In this case, the tailgate body 18 can be rearwardly tiltable for loading the vehicle when the rear window is advantageously fully accommodated within the tailgate body 18 and is then brought into the position illustrated in the FIGURE for driving, wherein the rear window can be open (position as illustrated) or closed.

REFERENCE NUMBERS

2 Car body
4 Bumper
6 Structural bow
8 Vehicle roof
10 Structural part
12 Upper side
14 Opening
16 Edge
18 Tailgate body
20 Handle
22 Rear window
24 Supplemental brake light
26 Light
28 Edge

The invention claimed is:

1. A tailgate for a motor vehicle, comprising:
a tailgate body,
a rear window mounted on the tailgate body and being lowerable into the tailgate body, and
a supplemental brake light provided on an upper area of the rear window,
wherein the lowerability of the rear window into the tailgate body is restricted such that the upper area of the rear window provided with the supplemental brake light remains visible and above the tailgate body at least when the motor vehicle is being driven.

2. A tailgate according to claim 1, wherein the supplemental brake light is affixed to the rear window with adhesive.

3. A tailgate according to claim 2, further comprising planar conductive leads attached to an edge area of the rear window and electrically coupled to the supplemental brake light for conducting power to the supplemental brake light.

4. A tailgate according to claim 1, further comprising planar conductive leads attached to an edge area of the rear window and electrically coupled to the supplemental brake light for conducting power to the supplemental brake light.

5. A tailgate according to claim 1, further comprising a frame partially or completely encompassing an edge area of the rear window, the supplemental brake light being integrated in the frame and the frame being at least partially lowerable into the tailgate body with the rear window.

6. A tailgate according to claim 5, wherein power supply conductors for the supplemental brake light are integrated into the frame.

7. A tailgate according to claim 1, wherein the rear window is arranged and constructed to be completely lowerable into the tailgate body when the motor vehicle is stationary or is not in operation so as to facilitate loading of the motor vehicle through a rear window opening.

8. A motor vehicle tailgate according to claim 1, wherein the tailgate body is arranged and constructed to be rearwardly tiltable with respect to the vehicle body when the rear window is fully accommodated within the tailgate body.

* * * * *